United States Patent
Caspi et al.

(10) Patent No.: US 7,856,091 B2
(45) Date of Patent: Dec. 21, 2010

(54) TELEPHONE SYSTEM RESPONSIVE TO CALL CONTROL PROTOCOL

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 2009 days.

(21) Appl. No.: 10/740,953

(22) Filed: Dec. 18, 2003

(65) Prior Publication Data

US 2005/0135585 A1    Jun. 23, 2005

(51) Int. Cl.
*H04M 3/42* (2006.01)
*H04L 12/66* (2006.01)

(52) U.S. Cl. ............... 379/201.01; 379/211.02; 379/212.01; 370/352

(58) Field of Classification Search .......... 379/201.01, 379/210.01, 88.12, 142.02, 212.01, 211.02; 455/420; 370/260, 352
See application file for complete search history.

(56) References Cited

U.S. PATENT DOCUMENTS

| | | | |
|---|---|---|---|
| 5,487,111 | A | 1/1996 | Slusky |
| 5,838,665 | A | 11/1998 | Kahn et al. |
| 5,999,611 | A | 12/1999 | Tatchell et al. |
| 5,999,612 | A * | 12/1999 | Dunn et al. ............ 379/212.01 |
| 6,058,104 | A | 5/2000 | Snelling et al. |
| 6,219,409 | B1 | 4/2001 | Smith et al. |
| 6,240,426 | B1 | 5/2001 | Beyda et al. |
| 6,253,249 | B1 | 6/2001 | Belzile |
| 6,308,062 | B1 * | 10/2001 | Chien et al. ................ 455/420 |
| 6,389,422 | B1 | 5/2002 | Doi et al. |
| 6,438,384 | B1 | 8/2002 | Chen |
| 6,542,584 | B1 | 4/2003 | Sherwood et al. |
| 6,597,687 | B1 * | 7/2003 | Rao ......................... 370/352 |
| 6,621,502 | B1 | 9/2003 | Nair et al. |
| 6,665,375 | B1 | 12/2003 | Forlenza et al. |
| 6,738,461 | B2 * | 5/2004 | Trandal et al. ......... 379/142.02 |
| 6,847,705 | B2 | 1/2005 | Park |
| 6,865,159 | B2 | 3/2005 | Weaver |
| 6,898,275 | B2 | 5/2005 | Dolan et al. |
| 6,934,511 | B1 | 8/2005 | Lovinggood et al. |
| 6,956,848 | B1 | 10/2005 | Keung et al. |
| 6,957,069 | B2 | 10/2005 | Shah et al. |

(Continued)

FOREIGN PATENT DOCUMENTS

EP    0 836 295 A2    4/1998

(Continued)

OTHER PUBLICATIONS

Real Time Communication Meets Real Time Information; A Siemens HiPath white paper on the OpenScape Suite of presence-aware application software Jun. 2003; pp. 1-10.

(Continued)

*Primary Examiner*—Thjuan K Addy
(74) *Attorney, Agent, or Firm*—Buckley, Maschoff & Talwalkar LLC

(57) ABSTRACT

Some embodiments provide receipt by a telephone of call control signals from an external device, the call control signals associated with a third party call control protocol, and execution of telephone call functionality in accordance with the call control signals.

5 Claims, 14 Drawing Sheets

U.S. PATENT DOCUMENTS

| | | | |
|---|---|---|---|
| 7,002,950 B1 | 2/2006 | Smith | |
| 7,003,087 B2 | 2/2006 | Spencer et al. | |
| 7,016,316 B2 | 3/2006 | Stobart | |
| 7,016,673 B2 | 3/2006 | Reddy et al. | |
| 7,039,027 B2 | 5/2006 | Bridgelall | |
| 7,058,047 B2 | 6/2006 | Sun et al. | |
| 7,058,171 B2 | 6/2006 | Ouchi et al. | |
| 7,103,167 B2 | 9/2006 | Brahm et al. | |
| 7,120,692 B2 | 10/2006 | Hesselink et al. | |
| 7,136,480 B2 | 11/2006 | Mason | |
| 7,174,165 B2 | 2/2007 | Lee | |
| 7,277,409 B1 | 10/2007 | Thermond et al. | |
| 7,280,528 B1 | 10/2007 | Polit et al. | |
| 7,308,081 B2 * | 12/2007 | Trandal et al. | 379/88.12 |
| 7,313,231 B2 | 12/2007 | Reid | |
| 7,349,412 B1 | 3/2008 | Jones et al. | |
| 7,372,822 B2 | 5/2008 | Caspi et al. | |
| 7,394,819 B2 | 7/2008 | Chen et al. | |
| 7,403,141 B2 | 7/2008 | Aragones et al. | |
| 7,508,927 B1 | 3/2009 | Trandal et al. | |
| 7,554,968 B1 | 6/2009 | Modarressi et al. | |
| 2001/0055279 A1 | 12/2001 | Abe | |
| 2002/0013162 A1 | 1/2002 | Whitney | |
| 2002/0031096 A1 * | 3/2002 | Johnson et al. | 370/260 |
| 2002/0069278 A1 | 6/2002 | Forslow | |
| 2002/0085515 A1 | 7/2002 | Bridgelall | |
| 2002/0085516 A1 | 7/2002 | Bridgelall | |
| 2002/0120686 A1 | 8/2002 | Schell, III et al. | |
| 2002/0131406 A1 | 9/2002 | Johnson, Jr. et al. | |
| 2003/0035471 A1 | 2/2003 | Pitsoulakis | |
| 2003/0063733 A1 | 4/2003 | Levine et al. | |
| 2003/0081752 A1 * | 5/2003 | Trandal et al. | 379/210.01 |
| 2003/0118007 A1 | 6/2003 | Williams et al. | |
| 2003/0218597 A1 | 11/2003 | Hodzic et al. | |
| 2004/0022383 A1 | 2/2004 | Duncan et al. | |
| 2004/0028205 A1 * | 2/2004 | Lim et al. | 379/211.02 |
| 2004/0041029 A1 | 3/2004 | Postman et al. | |
| 2004/0047455 A1 | 3/2004 | Le Pabic | |
| 2004/0114747 A1 | 6/2004 | Trandal et al. | |
| 2004/0131053 A1 | 7/2004 | Sjolund et al. | |
| 2004/0132485 A1 | 7/2004 | Charney et al. | |
| 2004/0180654 A1 | 9/2004 | Chen | |
| 2004/0190703 A1 * | 9/2004 | Trandal et al. | 379/210.01 |
| 2004/0240432 A1 | 12/2004 | Ying et al. | |
| 2004/0242244 A1 | 12/2004 | Liu | |
| 2004/0259544 A1 | 12/2004 | Amos | |
| 2004/0266490 A1 | 12/2004 | Silver | |
| 2005/0068938 A1 | 3/2005 | Wang et al. | |
| 2005/0069121 A1 | 3/2005 | Faruque et al. | |
| 2005/0119014 A1 | 6/2005 | Bandell et al. | |
| 2005/0135574 A1 | 6/2005 | Caspi et al. | |
| 2005/0135592 A1 | 6/2005 | Caspi et al. | |
| 2005/0135594 A1 | 6/2005 | Caspi et al. | |
| 2005/0136975 A1 | 6/2005 | Caspi et al. | |
| 2005/0141490 A1 | 6/2005 | Dolan | |
| 2005/0144291 A1 | 6/2005 | Frank et al. | |
| 2005/0147098 A1 | 7/2005 | Caspi et al. | |
| 2005/0165964 A1 | 7/2005 | Caspi et al. | |
| 2005/0227670 A1 | 10/2005 | Bicker | |
| 2006/0045257 A1 | 3/2006 | Caspi et al. | |
| 2006/0072552 A1 | 4/2006 | Shnitzer et al. | |
| 2007/0286396 A1 | 12/2007 | Alberth et al. | |
| 2008/0032716 A1 | 2/2008 | Forte | |
| 2009/0104898 A1 | 4/2009 | Harris | |

FOREIGN PATENT DOCUMENTS

| | | |
|---|---|---|
| GB | 2 305 331 A | 4/1997 |
| WO | 02/39702 A2 | 5/2002 |

OTHER PUBLICATIONS

OpenScape V1.0 New Intelligence in Communications; XP002322313, Apr. 2003; Siemens Enterprise Networks, 6 pgs.

OpenScape V1.0 Technical White Paper; XP00232214, Apr. 2003, Siemens Enterprise Networks; pp. 1-14.

"UART", Whatis.com Target Search, retrieved Jun. 15, 2010, download from http://watis.techtarget.com/definition/0,,sid9_gci213237,00.html, 3pgs.

* cited by examiner

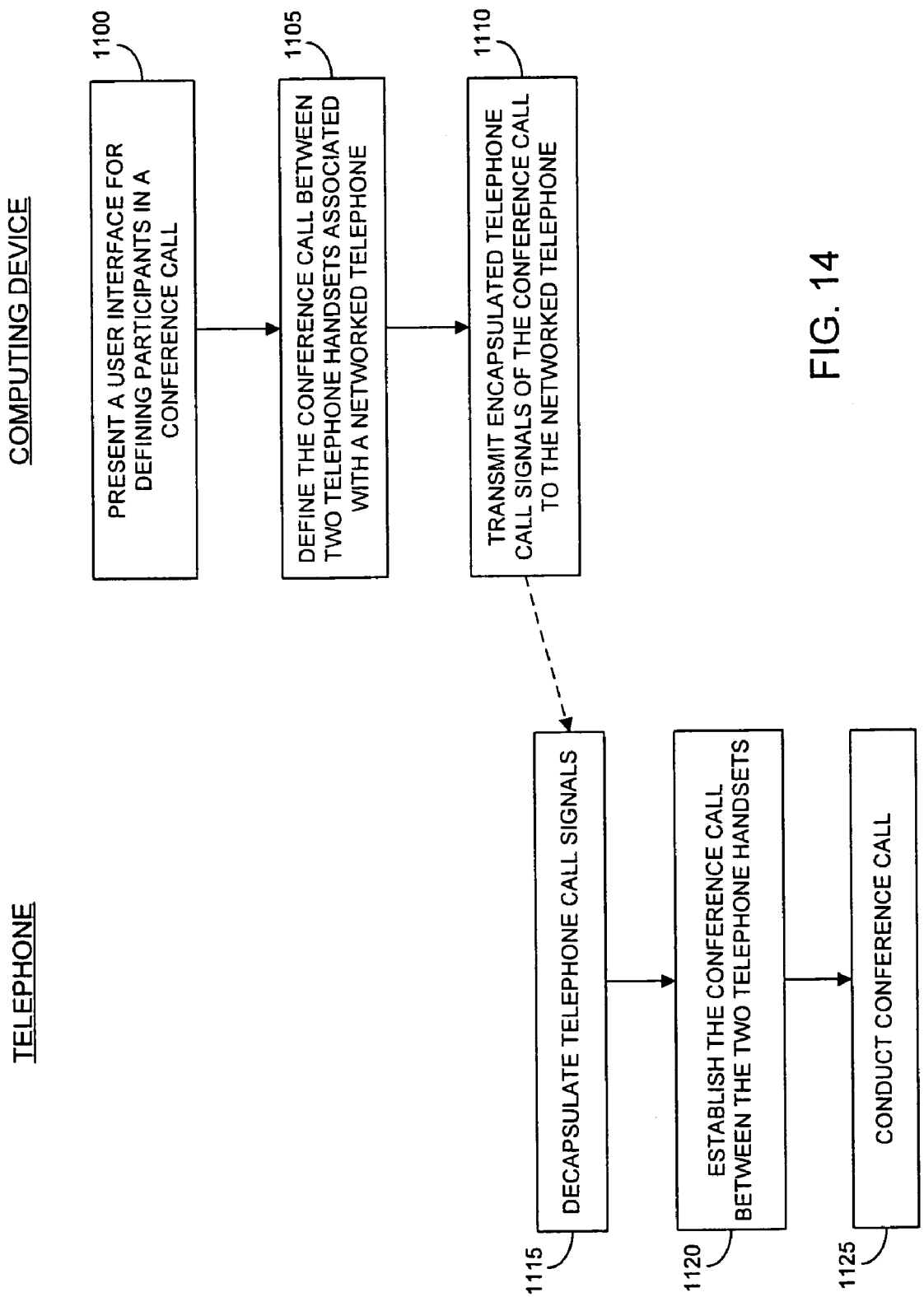

TELEPHONE SYSTEM RESPONSIVE TO CALL CONTROL PROTOCOL

CROSS-REFERENCE TO RELATED APPLICATIONS

The present application is related to commonly-assigned, co-pending U.S. patent application Ser. Nos. 10/740,951, entitled "Computer-Based Telephone Call Signaling"; 10/740,950, entitled "Networkable Telephone System"; 10/741,362, entitled "Computer-Implemented Telephone Call Conferencing System"; 10/741,663, entitled "Networked Telephone System"; 10/740,954, entitled "Computer-Based Telephone Call Conferencing"; 10/742,304, entitled "Computer-Based Telephone Call Management"; 10/741,474, entitled "Telephone Network/Computer Network Gateway", all of which were concurrently filed on Dec. 18, 2003.

BACKGROUND

1. Field

Embodiments may relate generally to telephone equipment. More particularly, some embodiments are concerned with telephone call control.

2. Description

Corporations may currently choose from a wide range of products to meet their telecommunications needs. Many of these products offer computer-telephony integration (CTI). Such integration may provide increased automation of tasks, productivity, and efficiency.

CTI often relies on communication between a computer network and one or more sophisticated pieces of telecommunications equipment, including but not limited to a private branch exchange (PBX). Elements of the computer network may control the PBX using call control signals. These call control signals may conform to a third-party or commonly-owned protocol, which may facilitate interoperability of equipment from disparate manufacturers. Home or small office users commonly do not possess the computing infrastructure or the telecommunications equipment required for the above-described functionality.

SUMMARY

Some embodiments provide receipt of call control signals from an external device, the call control signals associated with a third party call control protocol, and execution of telephone call functionality in accordance with the call control signals. Some aspects further include transmission of second call control signals to the external device, the second call control signals associated with the third party call control protocol. The call control signals may specify a first telephone functionality associated with a first one of a plurality of handsets that are associated with the telephone, and a second telephone functionality associated with a second one of the plurality of handsets.

According to some embodiments, provided are transmission of call control signals to a telephone, the call control signals associated with a third party call control protocol, and reception of second call control signals from the telephone, the second call control signals associated with the third party call control protocol. The call control signals may specify a first telephone functionality associated with a first one of a plurality of handsets that are associated with the telephone, and a second telephone functionality associated with a second one of the plurality of handsets.

Some embodiments provide a telephone and an external device coupled to the telephone. The telephone is to receive call control signals associated with a third party call control protocol from the external device, and to execute telephone call functionality in accordance with the call control signals. The telephone may also transmit second call control signals associated with the third party call control protocol to the external device.

With these and other advantages and features that will become hereinafter apparent, further information may be obtained by reference to the following detailed description of the invention, the appended claims and to the figures attached hereto.

BRIEF DESCRIPTION OF THE FIGURES

Some embodiments are illustrated in the accompanying figures, in which like reference numerals designate like parts, and wherein:

FIG. 14 is a flow diagram of a process according to some embodiments.

DETAILED DESCRIPTION

Figure 1:
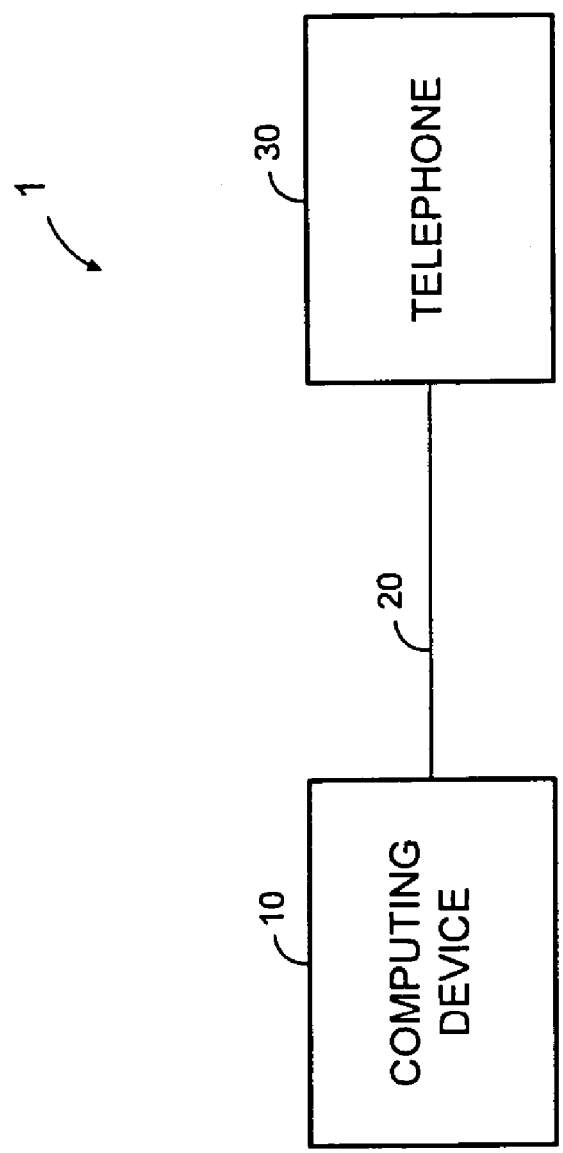
FIG. 1 is a block diagram of a system according to some embodiments.

FIG. 1 is a block diagram of system 1 according to some embodiments. System 1 includes computing device 10, computer network 20 and telephone 30. Some embodiments are generally described below with respect to FIG. 1, with more detailed descriptions thereof to follow.

According to some embodiments, computing device 10 may establish a telephone call through telephone 30 over computer network 20. The call may be established using a signaling protocol other than a Session Initiation Protocol. As will be described below, such embodiments may allow computing device 10 to provide call control features to telephone 30 that are not currently available in certain computing environments.

Telephone 30 may include an interface port to receive a computer network interface device such as a Personal Computer Memory Card International Association (PCMCIA) card. The network interface device may couple telephone 30 to computer network 20. Telephone 30 may also be coupled to a telephone line (not shown) to receive telephone call signals therefrom. In some embodiments, telephone 30 transmits information associated with received telephone signals to computing device 10.

Computing device 10 may establish a conference call between telephone 30 and another telephone according to some embodiments. A conference call may also or alternatively be established between two telephone handsets (not shown) that may be associated with telephone 30. Establishment of a conference call may include presenting a user interface to define workgroups, workgroup members, and/or conference call participants.

In some embodiments, computing device 10 selectively routes telephone call signals to telephone 30 based on user-specified rules. Computing device 10 may present a user interface to a user for defining the rules. The rules may be associated with telephone call signals to be received by telephone 30 and/or with telephone call signals sent from another telephone.

Figure 2:
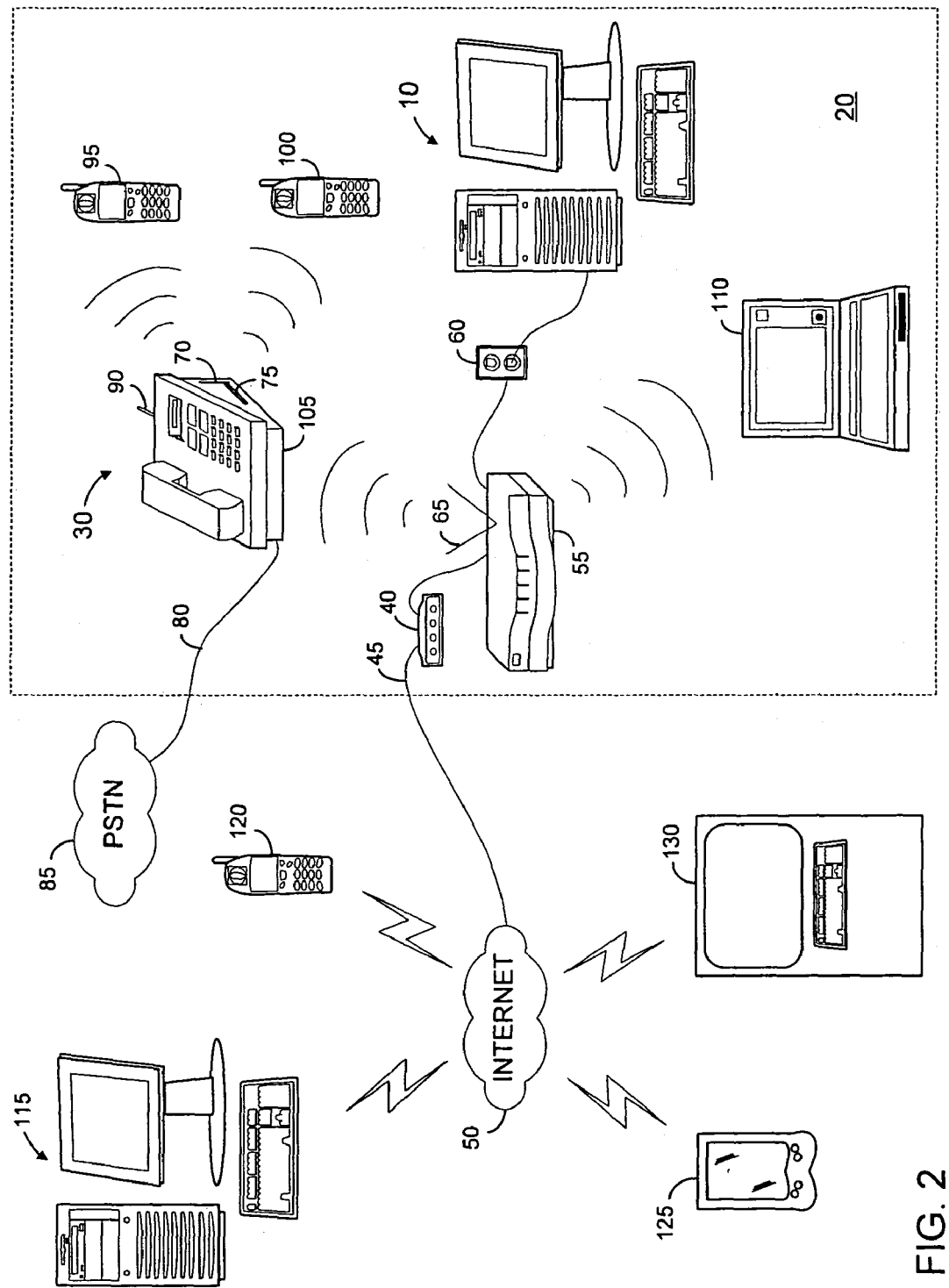
FIG. 2 is a diagram of a system architecture according to some embodiments.

FIG. 2 is a topographic view of a system architecture according to some embodiments. Of course, architectures other than that shown in FIG. 2 may be used to implement in some embodiments.

FIG. 2 shows network computing device 10 and telephone 30 disposed within network 20. In some embodiments, network 20 comprises a home and/or small office computing network. Many of the illustrated elements of network 20 are therefore typical of such an environment.

Network 20 may comprise one or more systems for transferring data, including a local area network, a wide area network, a telephone network, a cellular network, a fiber-optic network, a satellite network, an infra-red network, a radio frequency network, and any other type of network which may be used to transmit information between devices. Additionally, data may be transmitted through network 20 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Modem 40 is coupled to Internet connection 45. Internet connection 45 may comprise any currently- or hereafter-known media for connecting to Internet 50, such as a cable line, a telephone line, and a fractional T1 line. Modem 40 comprises any modem suitable for the particular type of Internet connection 45. Network 20 may transmit and receive data to and from Internet 50 via modem 40 and internet connection 45.

Modem 40 is coupled to router 55 to allow the elements of network 20 to share access to Internet 50. Router 55 is in turn coupled to network interfaces such as CAT5 jack 60 that may be dispersed throughout the physical environs of network 20. Computing device 10 is illustrated in FIG. 2 as a personal computer that is coupled to router 55 through network jack 60. Computing device 10 is therefore coupled to other elements of network 20 that are in communication with router 55. According to some embodiments, computing device 10 is a typical home and/or small office network server computer executing, for example, the Windows XP™ operating system. Computing device 10 may comprise any device or devices that are capable of performing the actions attributed herein to computing device 10.

Router 55 includes wireless antenna 65 for transmitting and receiving data according to a wireless networking protocol. Such protocols include, but are not limited to IEEE 802.11a, IEEE 802.11b, IEEE 802.11g, and ETSI BRAN. Other devices may therefore be wirelessly coupled to router 55 and to network 20.

Telephone 30 is wirelessly coupled to router 55 and to network 20 according to some embodiments. In this regard, telephone 30 may include computer network interface device 70 for communicating with router 55 in accordance with a wireless protocol. Telephone 30 may include interface port 75 for receiving device 70. Computer network interface device 70 may comprise a PCMCIA card, a Flash™ card, or any other suitable network interface device. In some embodiments, computer network interface device 70 provides a wired connection to network 20.

Telephone 30 is coupled to telephone line 80, which is in turn coupled to the packet-switched telephone network (PSTN) 85. Telephone line 80 may comprise an analog line, an Integrated Services Digital Network (ISDN) line, or other line compatible with PSTN 85. Telephone 30 may receive and transmit telephone call signals via telephone line 80. Telephone 30 may be coupled to more than one telephone line. In some embodiments, telephone 30 comprises any currently- or hereafter-known telephone suitable for home and/or small office use.

Telephone 30 includes antenna 90 for providing wireless communication between telephone handsets 95 and 100 and base 105. Telephone 30 may be capable of managing separate telephone calls that are conducted simultaneously using telephone handsets 95 and 100. Telephone 30 may also provide intercom, call transfer, conferencing, and/or other functions using handsets 95 and 100. In some embodiments, telephone 30 comprises a Gigaset® telephone manufactured by Siemens AG®.

Network 20 may also include devices such as laptop computer 110. In the illustrated embodiment, laptop computer 110 is wireless coupled to network 20. Any number of other elements may be coupled to network 20 via wireless and/or wired connections.

Devices 115 through 130 respectively comprise a desktop computer, a cellular telephone, a personal digital assistant, and an Internet kiosk. Each of these devices is directly or indirectly in communication with Internet 50. Accordingly, each of these devices provides a Web browser or other application for communicating with Internet 50. Each device may therefore receive data from and transmit data to network 20 if the security configuration of its respective network provides for such communication.

Detailed examples of operation of the FIG. 2 architecture according to some embodiments are provided below. The elements of FIG. 2 may be connected differently than as shown. For example, some or all of the elements may be connected directly to one another. Embodiments may include elements that are different from those shown. Moreover, although the illustrated communication links between the elements of FIG. 2 appear dedicated, each of the links may be shared by other elements. Elements shown and described as coupled or in communication with each other need not be constantly exchanging data. Rather, communication may be established when necessary and severed at other times or always available but rarely used to transmit data.

Figure 3:
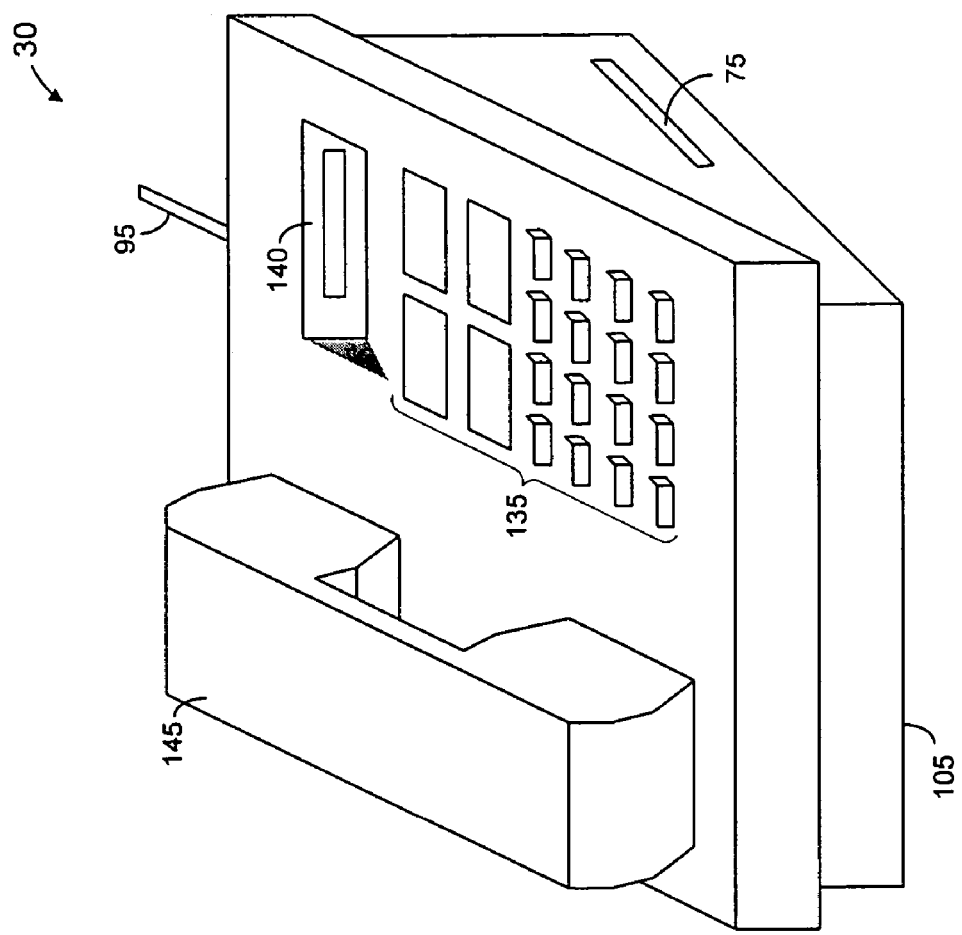
FIG. 3 is a view of a telephone according to some embodiments.

FIG. 3 is a close-up perspective view of telephone 30 according to some embodiments. FIG. 3 shows interface port 75 prior to receipt of a computer network interface device. Also shown are keypad 135 and display 140 which may be used during operation of telephone 30. Handset 145 may be wired or wirelessly connected to base 105 and used to conduct telephone calls.

Figure 4:
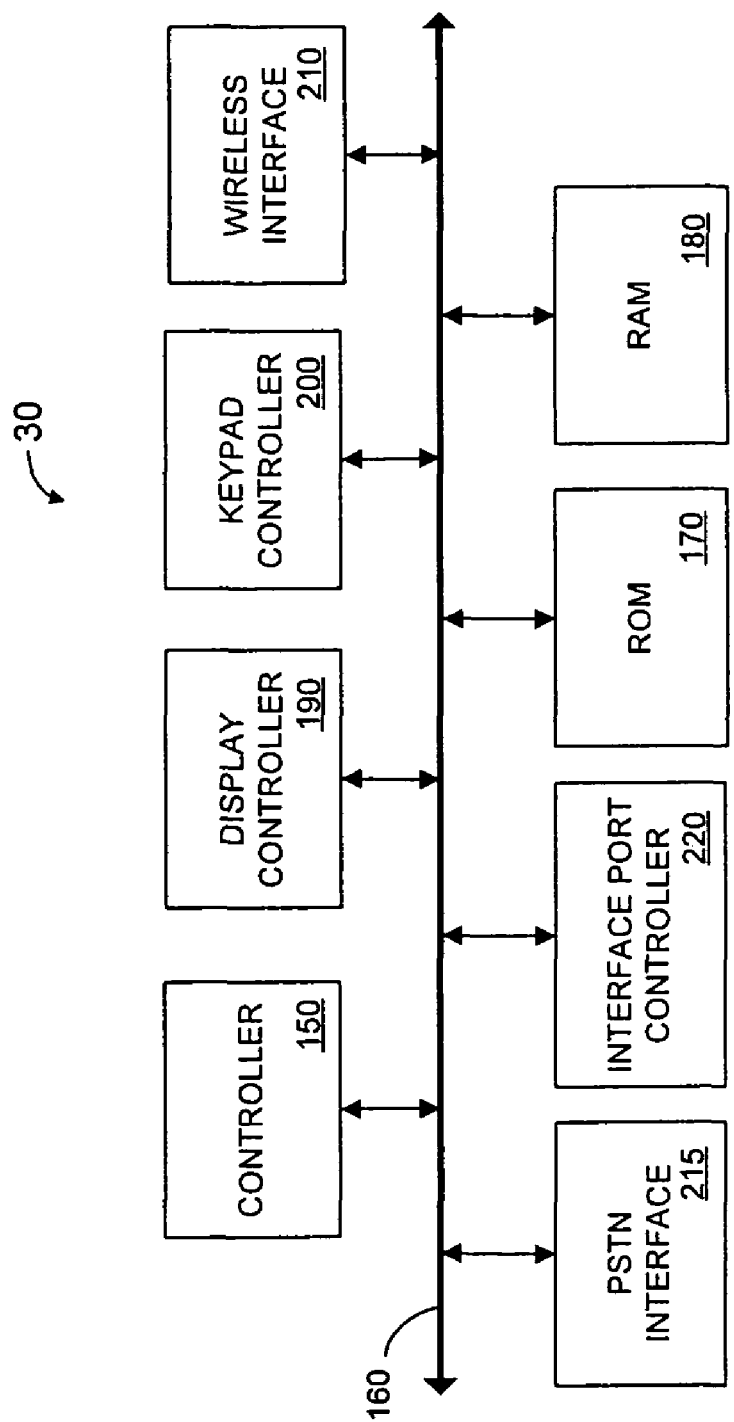
FIG. 4 is a block diagram of the internal architecture of a telephone according to some embodiments.

FIG. 4 is a block diagram of the internal architecture of telephone 30 according to some embodiments. As shown, controller 150 is coupled to bus 160. Bus 160 allows elements of telephone 30 to transmit signals to one another. In operation, controller 150 executes program code stored in Read Only Memory (ROM) 170 and Random Access Memory (RAM) 180. Telephone 30 may include other types of memory for storing program code and data.

Execution of program code allows controller 150 to control display controller 190, keypad controller 200, wireless interface 210, PSTN interface 215, and interface port controller 220 in accordance with some embodiments. For example, controller 150 may control PSTN interface 215 to receive telephone calls signals, may encapsulate the telephone call signals according to a computer network protocol (e.g., IP), and may thereafter control interface port controller 220 to transmit the encapsulated telephone call signals to a computer network interface device installed within interface port 75. The transmitted data may identify computing device 10 as the intended destination of the encapsulated telephone call signals.

In another example, controller 150 may execute program code to control interface port controller 220 to receive encapsulated telephone call signals from the computer network interface device, may decapsulate the encapsulated telephone call signals to generate telephone call signals, and may control wireless interface 210 to transmit the telephone call signals to one or both of handsets 95 and 100.

Controller 150 may also or alternatively execute program code to provide advanced calling features to users of telephone 30. Such features may include call conferencing, call transfer, and call forwarding among handsets 95 and 100. According to some embodiments, computing device 10 defines a conference call, telephone 30 receives a definition of the conference call from computing device 10 over network 20, and the conference call is established between two or more handsets of telephone 30 by controller 150.

The telephone call signals mentioned above include signaling and media information that may be formatted by telephone 30 according to a proprietary call control protocol. Generally, a call control protocol may be used to establish and manage telephone calls. Telephone 30 may utilize a call control protocol to manage telephone calls between handset 95 and/or handset 100 and an external device. In some embodiments, telephone 30 supports a third party call control protocol such as, but not limited to, Computer Supported Telecommunications Applications (CSTA) III.

For example, telephone 30 may receive call control signals associated with CSTA III from an external device such as computing device 10 via interface port controller 220, and may execute call control functionality based thereon. The call control signals may specify a first functionality associated with handset 95 and a second functionality associated with handset 100 according to some embodiments. Additionally, telephone 30 may transmit second call control signals associated with CSTA III to the external device. Some of the foregoing embodiments may facilitate the development of third party applications to control the functionality of telephone 30.

Figure 5:
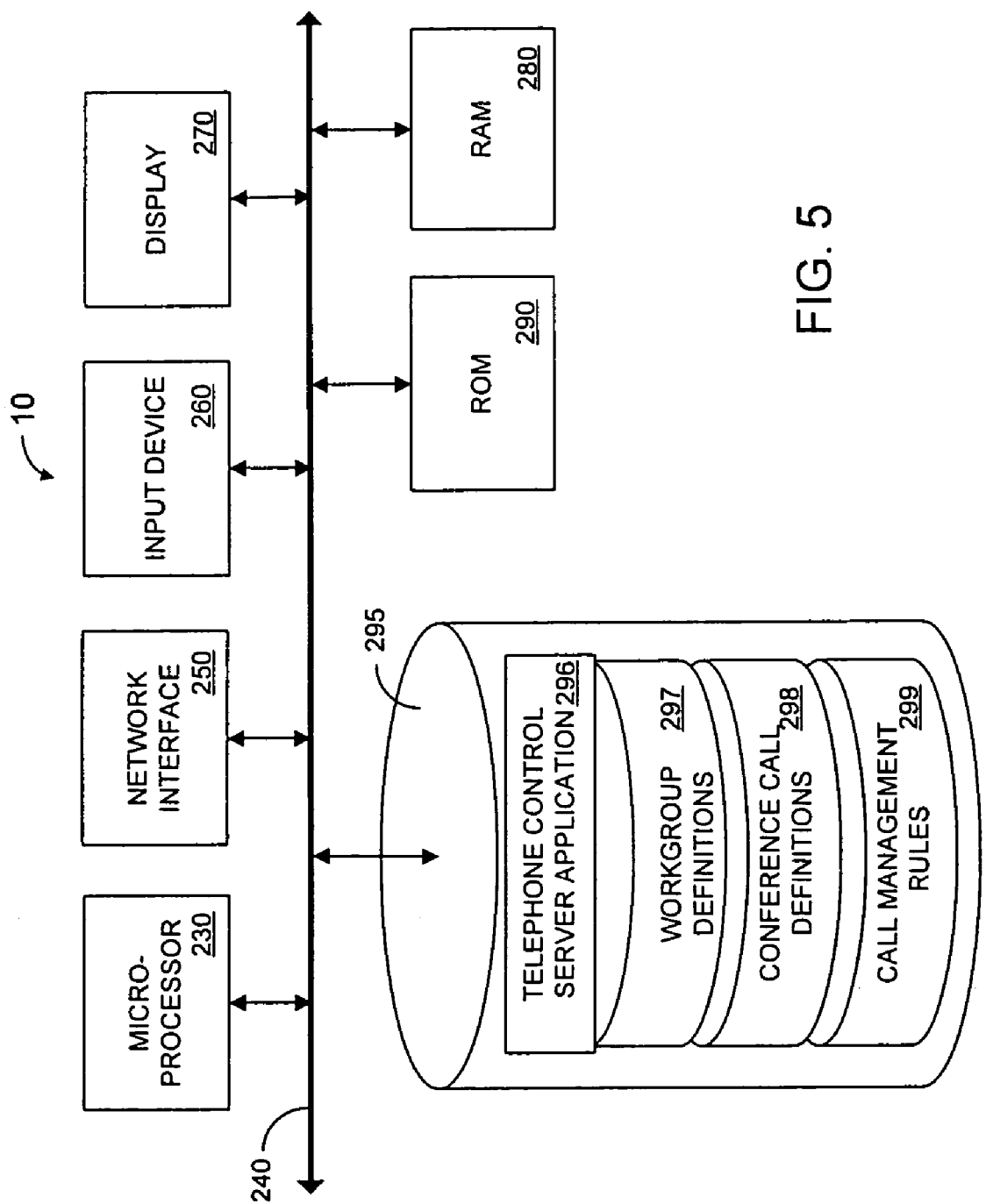
FIG. 5 is a block diagram of the internal architecture of a computing device according to some embodiments.

FIG. 5 is a representative block diagram of computing device 10 according to some embodiments. Computing device 10 may comprise a single device or computer, a networked set or group of devices or computers, a workstation, mainframe or host computer, etc. In some embodiments, computing device 10 comprises a device with sufficient memory and processing capability for use as a home and/or small office personal computer, workstation, and/or network server.

Computing device 10 of FIG. 5 includes microprocessor 230 in communication with communication bus 240. Microprocessor 230 is used to execute processor-executable process steps so as to control the components computing device 10 to provide functionality according to embodiments of the present invention. Microprocessor 230 may comprise a Pentium™, or Itanium™ microprocessor manufactured by Intel Corporation. Other suitable processors may be available from Motorola, Inc., AMD, or Sun Microsystems, Inc. Microprocessor 230 also may comprise one or more microprocessors, computers, computer systems, etc.

Also in communication with communication bus 240 is network interface 250. Network interface 250 may be configured with hardware suitable to physically interface and communicate with network 20. Network interface 250 may comprise a Peripheral Component Interconnect (PCI) card including a CAT5 and/or a wireless (e.g. 802.11b. 802.11g, ETSI BRAN) interface. Network interface 250 may operate in conjunction with device drivers executed by microprocessor to encapsulate and decapsulate data transmitted and received over network 20 in accordance with a network protocol supported by network 20. In some embodiments, computing device 10 receives and transmits encapsulated telephone call signals from and to telephone 30 over network interface 250.

Input device 260 and display 270 are also in communication with communication bus 240. Any known input device may be used as input device 260, including a keyboard, mouse, touch pad, voice-recognition system, or any combination of these devices. Input device 260 may be used by a user to input information and commands to computing device 10. Such information may include definitions of workgroups, definitions of conference call participants, and user-defined rules for telephone management. This information may also be received by computing device 10 from an external device via network interface 250.

Display 270 may be an integral or separate CRT display, a flat-panel display or the like. Display 250 is generally used to output graphics and text to an operator in response to commands issued by microprocessor 230. Display 270 may display user interfaces for receiving definitions of workgroups, definitions of conference call participants, and user-defined rules for telephone management.

RAM 280 is connected to communication bus 240 to provide microprocessor 230 with fast data storage and retrieval. In this regard, processor-executable process steps being executed by microprocessor 230 are typically stored temporarily in RAM 280 and executed therefrom by microprocessor 230. ROM 290, in contrast, may provide storage from which data can be retrieved but to which data cannot be stored. Accordingly, ROM 290 may be used to store invariant process steps and other data, such as basic input/output instructions and data used during system boot-up or to control input device 260. One or both of RAM 280 and ROM 290 may communicate directly with microprocessor 230 instead of over communication bus 240.

Data storage device 295 stores, among other data, processor-executable process steps of telephone control server application 296. Telephone control server application 296 may comprise process steps that are executable to provide all, some, or none of the functionality attributed herein to computing device 30.

Application 296 may also comprise process steps of a Web server and may be executed to provide information to a Web client, such as a Web browser executed by device 115 of FIG. 2. Generally, such a Web server receives Hypertext Transfer Protocol (HTTP) requests from a Web client and, in response, creates and sends appropriate Web pages to the Web client. Information may also be received from the Web client, including definitions of workgroups, definitions of conference call participants, and user-defined rules for telephone management. The functionality of telephone control server application 296 will be described in more detail below with respect to FIG. 6.

The process steps of telephone control server application 296 may be read from a computer-readable medium, such as a floppy disk, a CD-ROM, a DVD-ROM, a Zip™ disk, a magnetic tape, or a signal encoding the process steps, and then stored in data storage device 295 in a compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware and software.

Data storage device 295 also stores workgroup definitions database 297, conference call definitions database 298, and call management rules database 299. Workgroup definitions database 297 may include data associating individuals and/or communication devices with particular workgroups. In some embodiments, an individual may be associated with one or more communication devices, and/or an individual or a device may be associated with more than one workgroup. The data stored in workgroup definitions database 297 may be received from unshown collaboration applications (e.g., WebEX™, LiveMeeting™), and/or from a user through one or more user interfaces provided by application 296 and displayed by display 270.

Conference call definitions database 298 may include data defining conference calls. Such data may include call participants (e.g., individuals, devices, and/or workgroups), call time, call duration, call topic, and dialing instructions. This data may be received from collaboration applications and/or from a user via user interfaces provided by application 296 and displayed by display 270.

Call management rules database 299 may comprise rules for managing incoming and/or outgoing telephone calls. For example, the rules may specify that certain received calls should be directly transmitted to a voice mail system, and/or that other received calls should be transferred to a home telephone. The rules may be triggered based on call sender, call recipient, called party availability, time of day, and/or any other factors. A user may use user interfaces provided by application 296 and displayed by display 270 to input the rules into database 299.

One or more of databases 297 through 299 may be stored within an external database server that is connected to computing device 10 via network 20. Such a server may also be directly connected to computing device 10 via a communication medium such as a serial port cable, telephone line or radio frequency transceiver.

Stored in data storage device 295 may also be other unshown elements that may be necessary for operation of computing device 10, such as other applications, other data files, a network server, an operating system, a database management system and "device drivers" for allowing microprocessor 230 to interface with external devices. These elements are known to those skilled in the art, and are therefore not described in detail herein.

Figure 6:
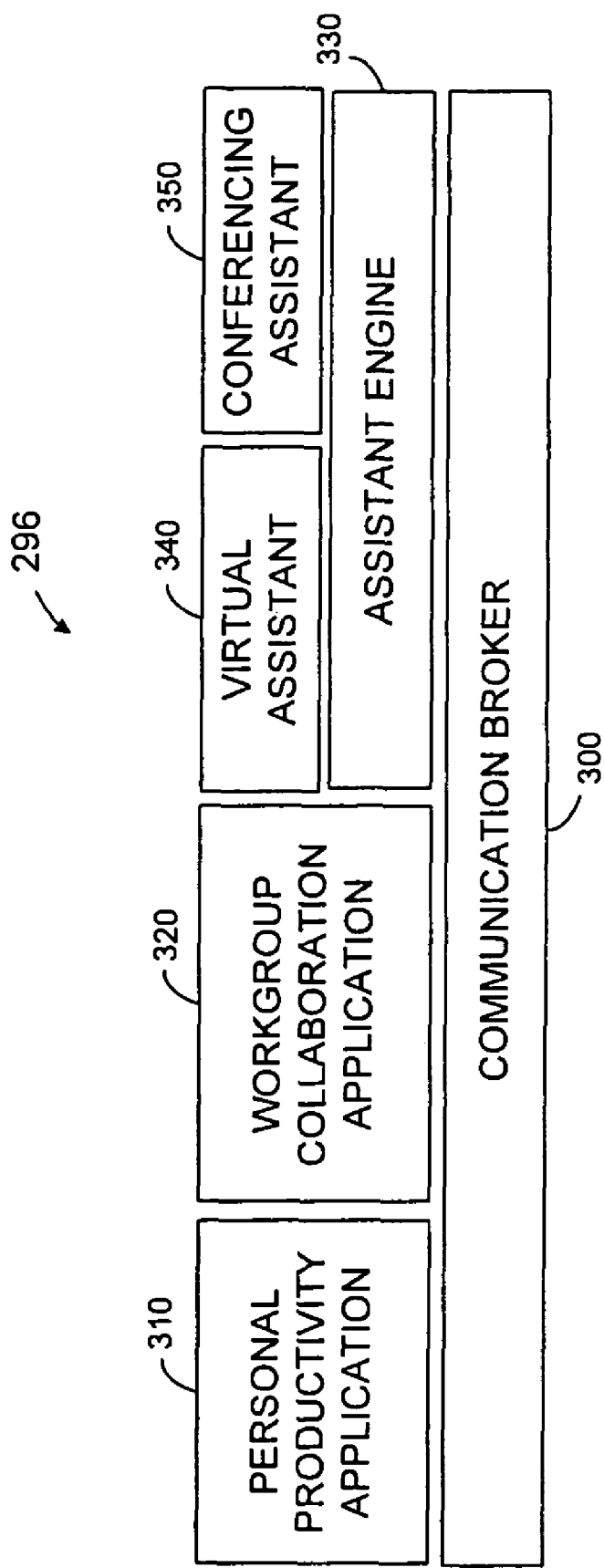
FIG. 6 is a block diagram of the software architecture of a server application according to some embodiments.

FIG. 6 illustrates several components of the software architecture of telephone control server application 296 according to some embodiments. The first layer of the architecture includes communication broker 300. Communication broker 300 may comprise a collection of middleware interfaces and adapting layers that enable application 296 to communicate with disparate systems. In some embodiments, communication broker 300 decapsulates incoming information and encapsulates outgoing information in accordance with the IP protocol.

Personal productivity application 310 may be used to define rules for routing and/or managing telephone calls. As mentioned above, the rules may specify that certain received calls should be directly transmitted to a voice mail system, and/or that other received calls should be transferred to a home telephone. The rules may be triggered based on call sender, call recipient, called party availability, time of day, and/or any other factors.

Application 310 may provide for rules that are based on the presence of specified parties. Such presence may be detected using presence-related features of other applications (e.g., Windows Messenger™) that may be installed within computing device 10.

Personal productivity application 310 may capture user-defined rules by presenting a suitable user interface and by capturing the information input thereto. The rules may then be stored in call management rules database 299. In some embodiments, personal productivity application 310 provides a Web portal. A user may access such a portal using a device that is coupled to computing device 10 over an IP network. Such a device may be internal to network 20 (e.g., laptop computer 110) or external thereto (e.g., personal digital assistant 125.

Workgroup collaboration application 320 may be executed to associate individuals and/or communication devices with particular workgroups. As described above, these associations may be stored in workgroup definitions database 297. The particular individuals and/or devices that are associated with workgroups may be obtained from data stored by other contact, collaboration and/or calendaring applications (e.g., WebEX™, LiveMeeting™), and/or from a user through one or more user interfaces provided by application 296. Again, such user interfaces may be presented on display 270 and/or within a Web browser window of a remote device.

Workgroup collaboration application 320 may also provide for the definition of conference calls. The definitions may be stored in conference call definitions database and may include call participants (e.g., individuals, devices, and/or workgroups), call time, call duration, call topic, and dialing instructions. The definitions may be received from collaboration applications and/or from a user interface provided by application 320.

Assistant engine 330 may convert information between a first format and a format native to application 296. In some embodiments, assistant engine 330 convert telephone call signals between a native Gigaset® format and a native Openscape®-format. Openscape® identifies a communications software suite developed by Siemens AG®.

Assistant engine 330 passes telephone call signals to virtual assistant 340 and conferencing assistant 350. Virtual assistant 340 applies user-defined rules to selectively route the received telephone call signals. The rules may be stored in call management rules database 299 or elsewhere. Conferencing assistant 350 may establish a conference call between telephone 30 and at least one other telephone based on conference call definitions stored in conference call definitions database 298. A conference call definition may specify a workgroup to participate in a conference call, therefore conferencing assistant 350 may also access workgroup definitions database 297 to establish a conference call. In some embodiments, conferencing assistant 350 defines a conference call and telephone 30 establishes the conference call using its embedded conferencing capability as described above.

Telephone control server application 296 may include more components than shown in FIG. 6. Some embodiments do not include one or more of the illustrated components of application 296. In some embodiments, one or more elements of application 296 may be stored and/or executed external to computing device 10. Moreover, one or both of applications 310 and 320 may be installed as a "plug-in" to an existing application and/or may comprise a standalone application.

Figure 7:
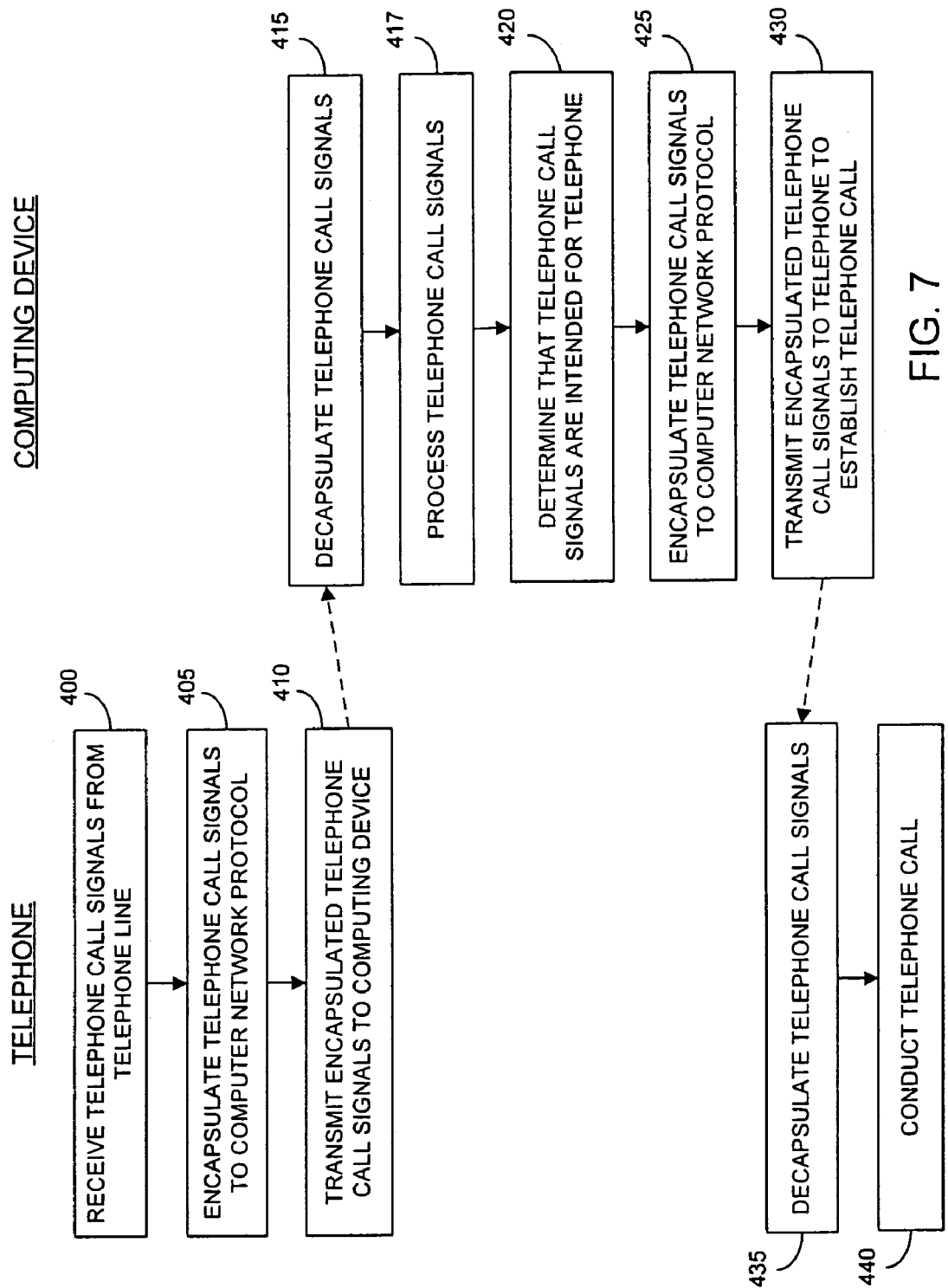
FIG. 7 is a flow diagram of a process according to some embodiments.

FIG. 7 is a flow diagram of process steps according to some embodiments. The process steps may be executed by elements of telephone 30 and elements of computing device 10 as shown in FIG. 7. The process steps may be performed by any device or by any number of devices in combination. Moreover, some or all of the process steps may be performed manually.

Initially, at 400, telephone 30 receives telephone call signals from telephone line 80. The telephone call signals include signaling and media information and may originate from PSTN 85 and be received by PSTN interface 215. Next, at 405, controller 150 of telephone 30 encapsulates the telephone call signals in accordance with a computer network protocol such as IP protocol. The telephone call signals may be formatted prior to encapsulation according to a proprietary and/or third party call control protocol. The encapsulated telephone call signals are transmitted over network 20 to computing device 10 via interface port controller 220 at 410.

Computing device 10 receives the encapsulated telephone call signals over network interface 250 and decapsulates the telephone call signals at 415. Assistant engine 330 may thereafter convert the telephone call signals from a first format to a second format that is compatible with telephone control server application 296. The telephone call signals are then processed at 417 by one or both of virtual assistant 340 and conferencing assistant 250 according to some embodiments. Telephone control server application 296 then determines that the telephone call signals are intended for telephone 30 at 420.

Assistant engine 330 may convert the telephone call signals back to the first format and communication broker 300 may encapsulate the telephone call signals in accordance with the computer network protocol at 425. At 430, computing device 10 transmits the encapsulated telephone call signals back to telephone 30 to establish a telephone call with telephone 30. Accordingly, telephone 30 receives and decapsulates the telephone call signals at 435 and conducts a telephone call based on the telephone call signals at 440.

Figure 8:
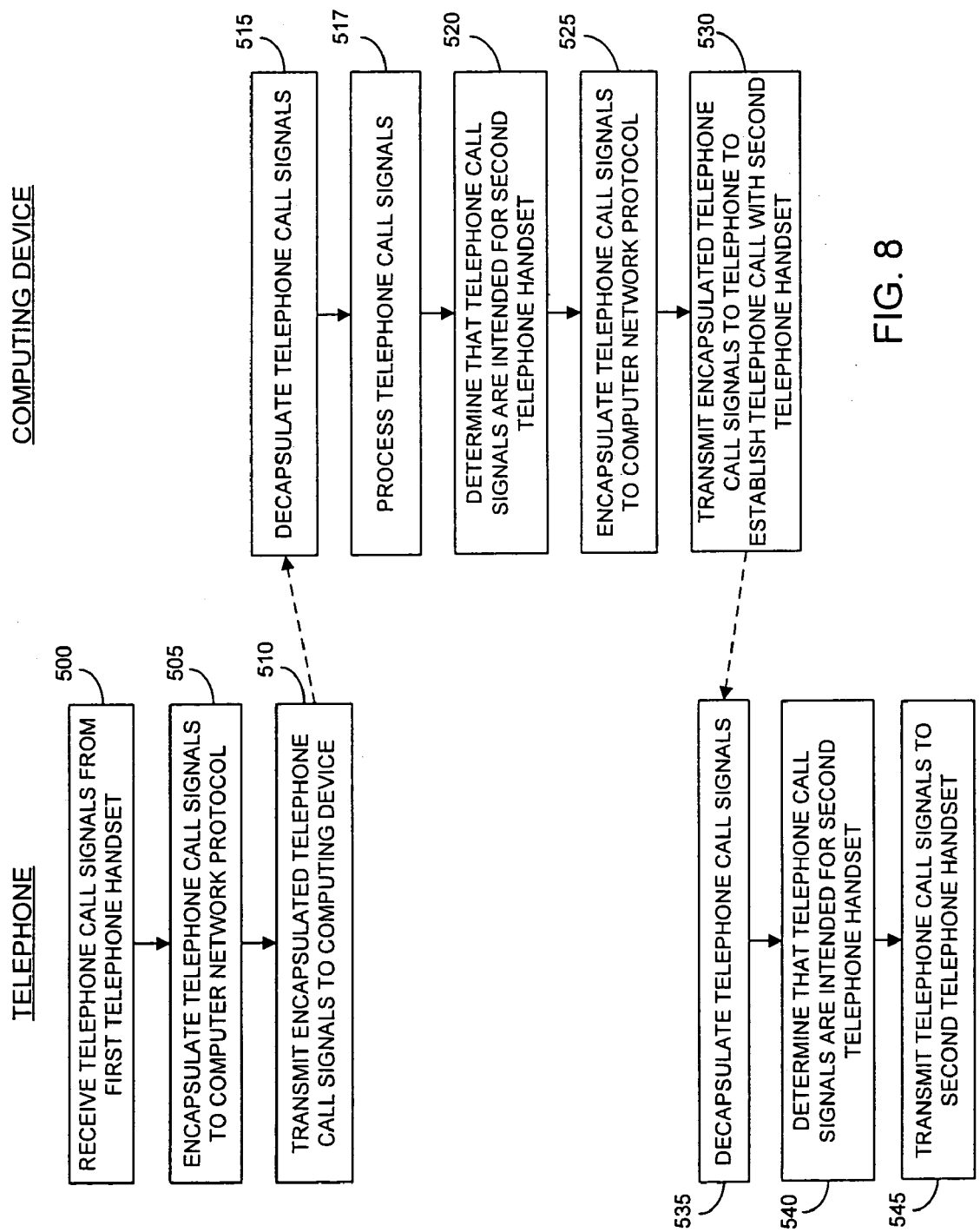
FIG. 8 is a flow diagram of a process according to some embodiments.

FIG. 8 is a flow diagram of process steps according to some embodiments. The FIG. 8 process steps may be executed to establish a telephone call between telephone handset 95 and telephone handset 100.

Antenna 90 of telephone 30 receives telephone call signals from telephone handset 95 at 500. In some embodiments, the telephone call signals are formatted in accordance with a proprietary protocol of telephone 30. Controller 150 of telephone 30 encapsulates the telephone call signals in accordance with a computer network protocol at 505. The encapsulated telephone call signals are then transmitted over network 20 to computing device 10 via interface port controller 220 at 510.

Computing device 10 receives the encapsulated telephone call signals over network interface 250 and decapsulates the telephone call signals at 515. Assistant engine 330 may thereafter convert the telephone call signals from a first format (e.g., proprietary or third party) to a second format that is compatible with telephone control server application 296. The telephone call signals are then processed at 517 by one or both of virtual assistant 340 and conferencing assistant 250 according to some embodiments. Telephone control server application 296 then determines, at 520, that the telephone call signals are intended for telephone handset 100.

Next, at 525, assistant engine 330 may convert the telephone call signals back to the first format and communication broker 300 may encapsulate the telephone call signals in accordance with the computer network protocol. At 530, computing device 10 transmits the encapsulated telephone call signals back to telephone 30 to establish a telephone call with telephone handset 100. Telephone 30 receives and decapsulates the telephone call signals at 535, and determines that the telephone call signals are intended for telephone handset 100 at 540. Telephone 30 then transmits the telephone call signals to handset 100 via antenna 90 at 545 so that handset 100 may conduct the telephone call.

Figure 9:
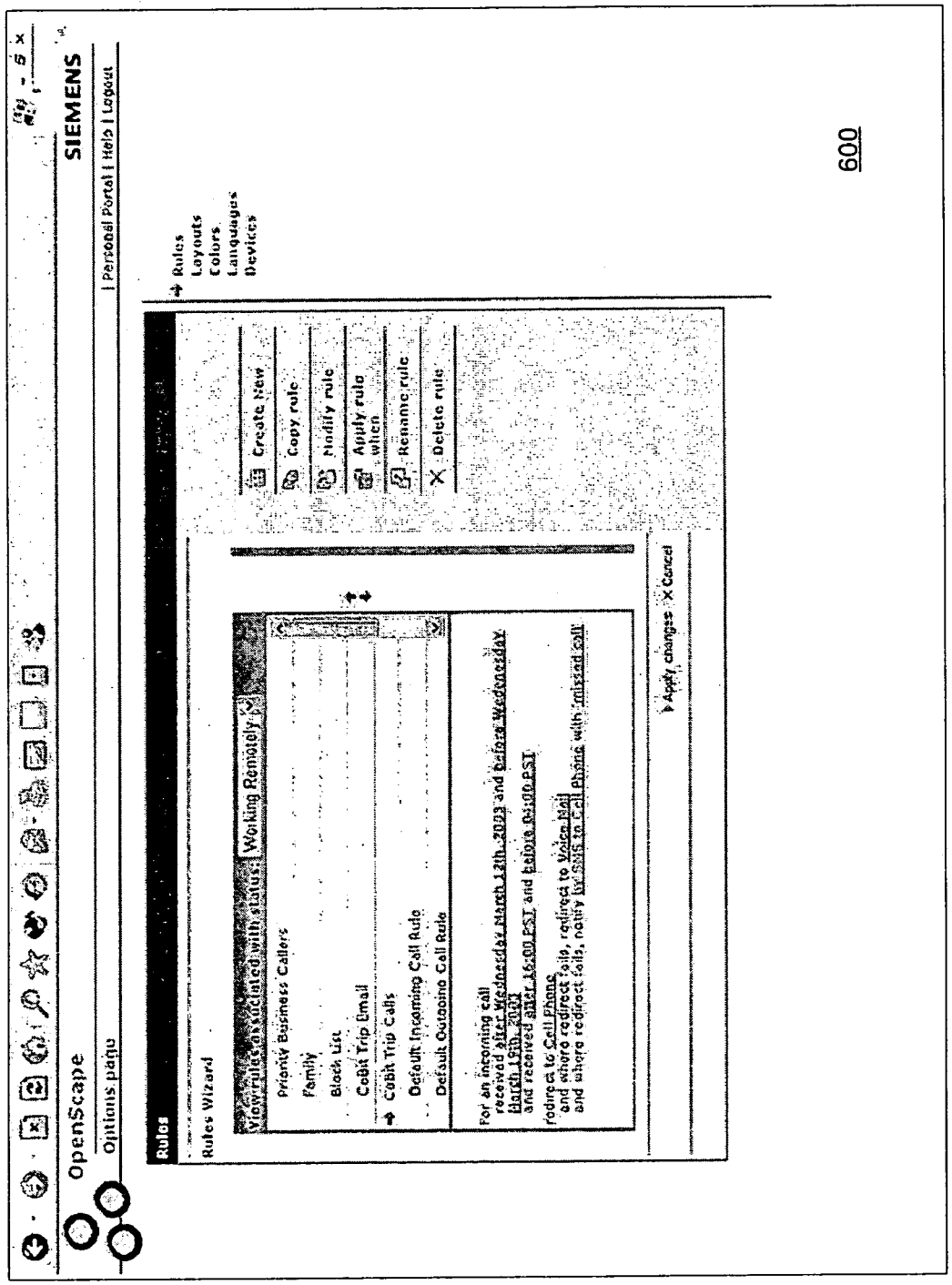
FIG. 9 is an outward view of a user interface according to some embodiments.

FIG. 9 is a representative view of web page 600 according to some embodiments. Web page 600 may comprise a user interface for defining rules. The rules may be applied to incoming and/or outgoing telephone calls to selectively route the telephone calls. For example, the rules may specify that certain received calls should be directly transmitted to a voice mail system, and/or that other received calls should be transferred to a home telephone. The rules may be triggered based on call sender, call recipient, called party availability, time of day, and/or any other factors. Any suitable interface for defining such rules may be used in conjunction with some embodiments. Once the rules are input using an interface such as Web page 600, the rules may be stored in call management rules database 299 or elsewhere.

Web page 600 may be displayed on display 270 of computing device 10 or on the display of any other device having access to a Web server provided by telephone control server application 296. More specifically, a user may operate a device to input an appropriate Uniform Resource Locator (URL) into a Web browser provided by the device. In response, an IP address corresponding to the URL is retrieved from a Domain Name Server coupled to Internet 50 and a request for a particular Web page is sent via HTTP to the IP address. The Web page is then transmitted to and displayed by the Web browser as shown in FIG. 9.

Figure 10:
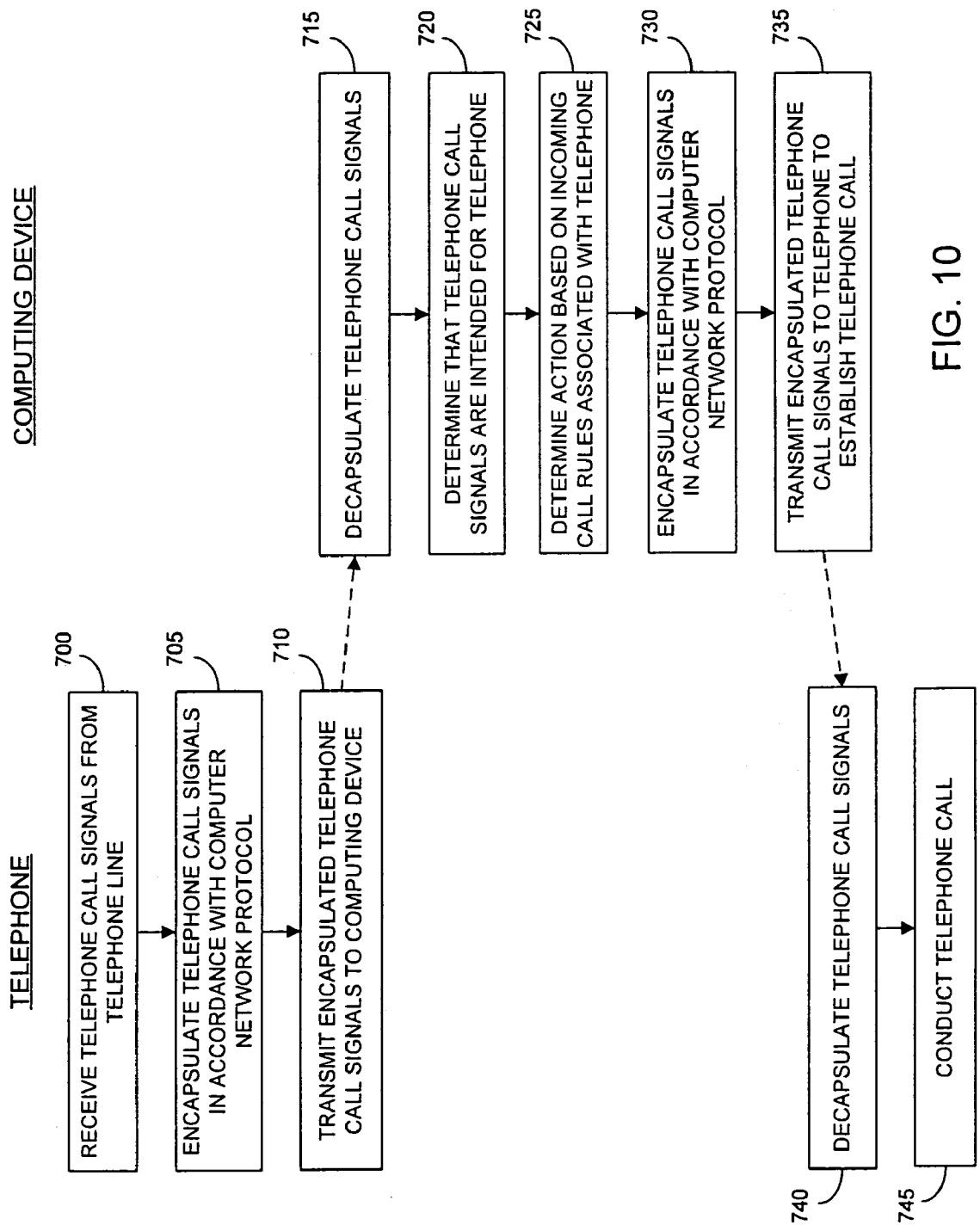
FIG. 10 is a flow diagram of a process according to some embodiments.

FIG. 10 is a flow diagram of process steps to selectively route telephone calls based on user-defined rules according to some embodiments. Telephone 30 initially receives telephone call signals from telephone line 80 at 700. The telephone call signals are encapsulated in accordance with a computer network protocol of network 20 at 705. Next, at 710, the encapsulated telephone call signals are transmitted over network 20 to computing device 10 via interface port controller 220.

At 715, computing device 10 receives the encapsulated telephone call signals over network interface 250 and decapsulates the telephone call signals. Assistant engine 330 may then convert the telephone call signals from a first format of telephone 30 to a second format that is compatible with virtual assistant 340.

Virtual assistant 340 determines that the telephone call signals are intended for telephone 30 at 720. Virtual assistant 340 then determines, at 725, an action based on incoming call rules associated with telephone 30. More specifically, virtual assistant 340 may access call management rules database 299 to identify rules that are to be applied to telephone call signals intended for telephone 30. As described above, these rules may specify that certain telephone call signals intended for telephone 30 should be directly routed to a voice mail system, and/or that other telephone call signals intended for telephone 30 should be routed elsewhere. The rules may specify routing of the telephone call signals based on sender, recipient, recipient presence information, time of day, and/or any other factors.

In the present example, it will be assumed that it is determined at 725 to route the telephone call signals to telephone 30. Therefore, at 730, assistant engine 330 may convert the telephone call signals back to the first format and communication broker 300 may encapsulate the telephone call signals in accordance with the computer network protocol.

Next, at 735, computing device 10 transmits the encapsulated telephone call signals back to telephone 30 to establish a telephone call. Accordingly, telephone 30 receives and decapsulates the telephone call signals at 740 and conducts a telephone call based on the telephone call signals at 745.

Figure 11:
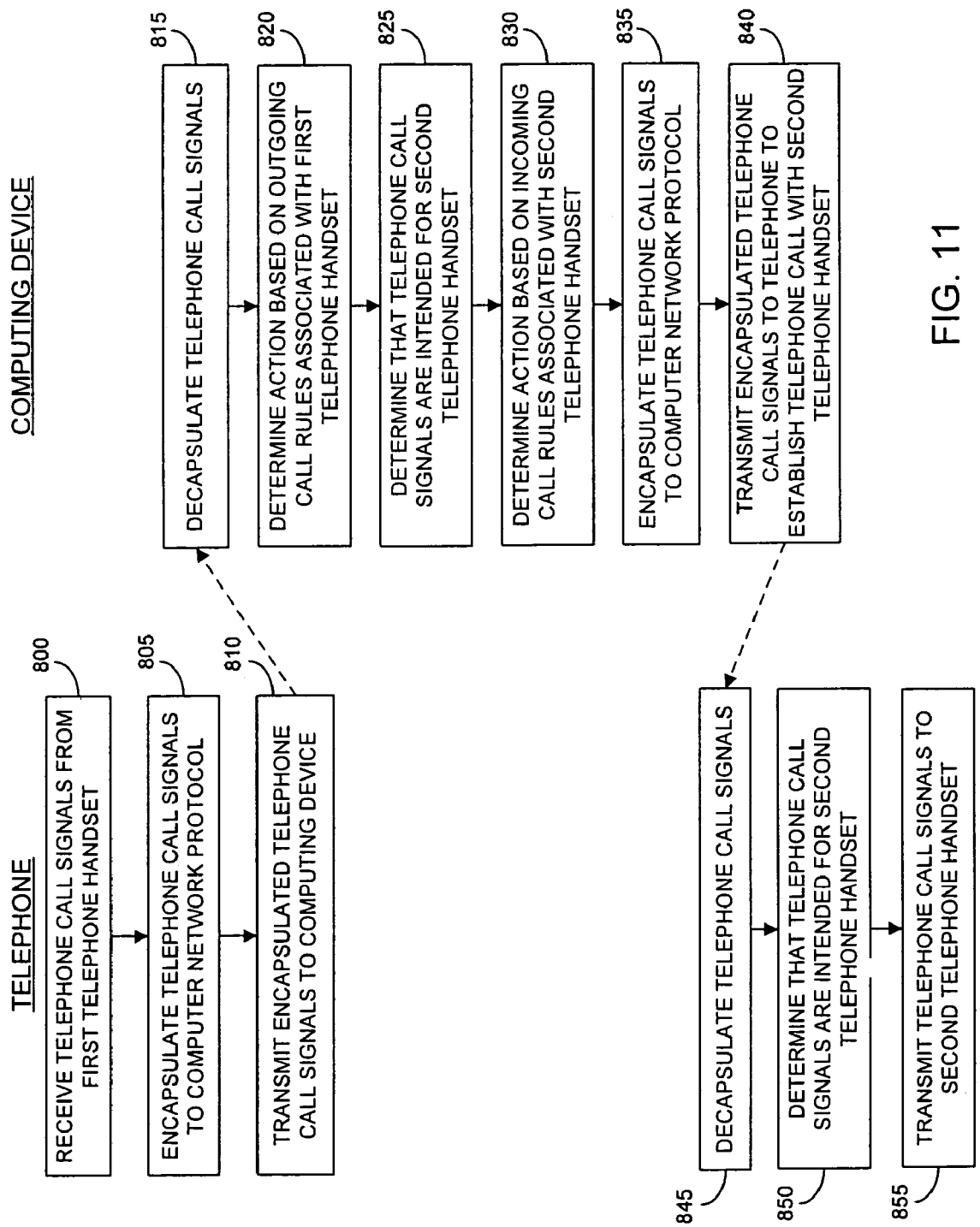
FIG. 11 is a flow diagram of a process according to some embodiments.

The FIG. 11 process steps may be executed to selectively route a telephone call between telephone handset 95 and telephone handset 100 based on user-defined rules according to some embodiments.

Antenna 90 of telephone 30 receives telephone call signals from telephone handset 95 at 800. The telephone call signals may be formatted in accordance with a proprietary protocol of telephone 30. Telephone 30 encapsulates the telephone call signals in accordance with a computer network protocol such as IP protocol at 805. The encapsulated telephone call signals are then transmitted, at 810, over network 20 to computing device 10 via interface port controller 220.

Computing device 10 receives the encapsulated telephone call signals over network interface 250 and decapsulates the telephone call signals at 815. Assistant engine 330 may then convert the telephone call signals from a first format of telephone 30 to a second format that is compatible with virtual assistant 340. Virtual assistant 340 then determines, at 820, an action based on outgoing call rules associated with telephone handset 95.

As mentioned above, virtual assistant 340 may access call management rules database 299 at 820 to identify rules that are to be applied to telephone call signals transmitted from telephone handset 95. These rules may specify that certain telephone call signals transmitted from telephone handset 95 should be delayed for a specified period of time, and/or that other telephone call signals transmitted from telephone handset 95 should be routed somewhere other than the originally-intended destination. For purposes of the present example, it will be assumed that it is determined at 820 to route the telephone call signals to their intended destination.

Virtual assistant 340 determines that the telephone call signals are intended for telephone handset 100 at 825. Virtual assistant 340 then determines, at 830, an action based on incoming call rules associated with telephone handset 100. These rules may also be stored in call management rules database 299. It will be assumed that virtual assistant 340 determines to route the telephone call signals to telephone handset 100 at 830. Therefore, at 835, assistant engine 330 may convert the telephone call signals back to the first format and communication broker 300 may encapsulate the telephone call signals in accordance with the computer network protocol.

Next, at 840, computing device 10 transmits the encapsulated telephone call signals back to telephone 30 to establish a telephone call with telephone handset 100. Telephone 30 receives and decapsulates the telephone call signals at 845, and determines that the telephone call signals are intended for telephone handset 100 at 850. At 855, telephone 30 then transmits the telephone call signals to handset 100 via antenna 90 so that handset 100 may conduct the telephone call.

In some embodiments, virtual assistant 340 determines at 825 that the telephone call signals are intended for a telephone located in PSTN 85. Accordingly, virtual assistant 340 would then determine an action based on incoming call rules associated with the externally-located telephone, if any such rules exist. The telephone call signals would then be transmitted to telephone 30 and to PSTN 85 through telephone line 80.

Figure 12:
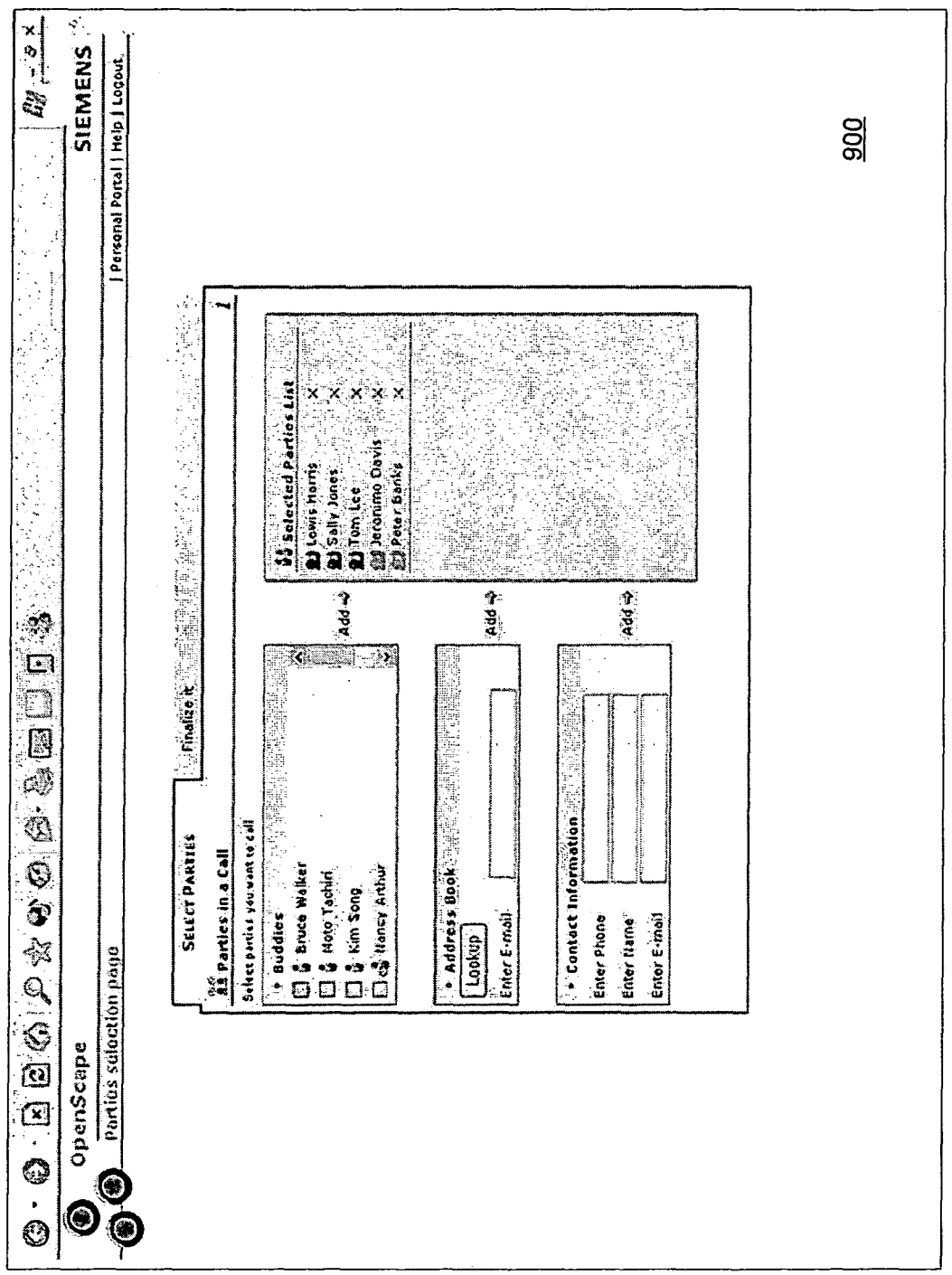
FIG. 12 is an outward view of a user interface according to some embodiments.

FIG. 12 is a representative view of web page 900 according to some embodiments. Web page 900 may be displayed on display 270 of computing device 10 or on the display of any other device having access to a Web server provided by telephone control server application 296.

Web page 900 may comprise a user interface for defining a conference call. Accordingly, Web page 900 may comprise elements for selecting participants, communication devices and/or workgroups. Web page 900 may also include elements for defining members of one or more workgroups. In some embodiments, an individual may be associated with one or more communication devices, and/or an individual or a device may be associated with more than one workgroup.

Web page 900 according to some embodiments includes elements for specifying other conference call details such as call time, call duration, call topic, and dialing instructions. The participants, communication devices and/or workgroups that are selectable via Web page 900 may be extracted from a local or remote address book (e.g. Microsoft Outlook™, Lotus Notes™), and/or from other collaboration applications (e.g., WebEx™, LiveMeeting™) installed in computing device 10.

Any suitable interface for defining workgroups and/or conference calls may be used in conjunction with some embodiments. Such a user interface may be composed of a plurality of individual Web pages and/or other interfaces. The defined workgroups and conference calls may be stored in workgroup definitions database 297 and conference call definitions database 298, respectively.

Figure 13:
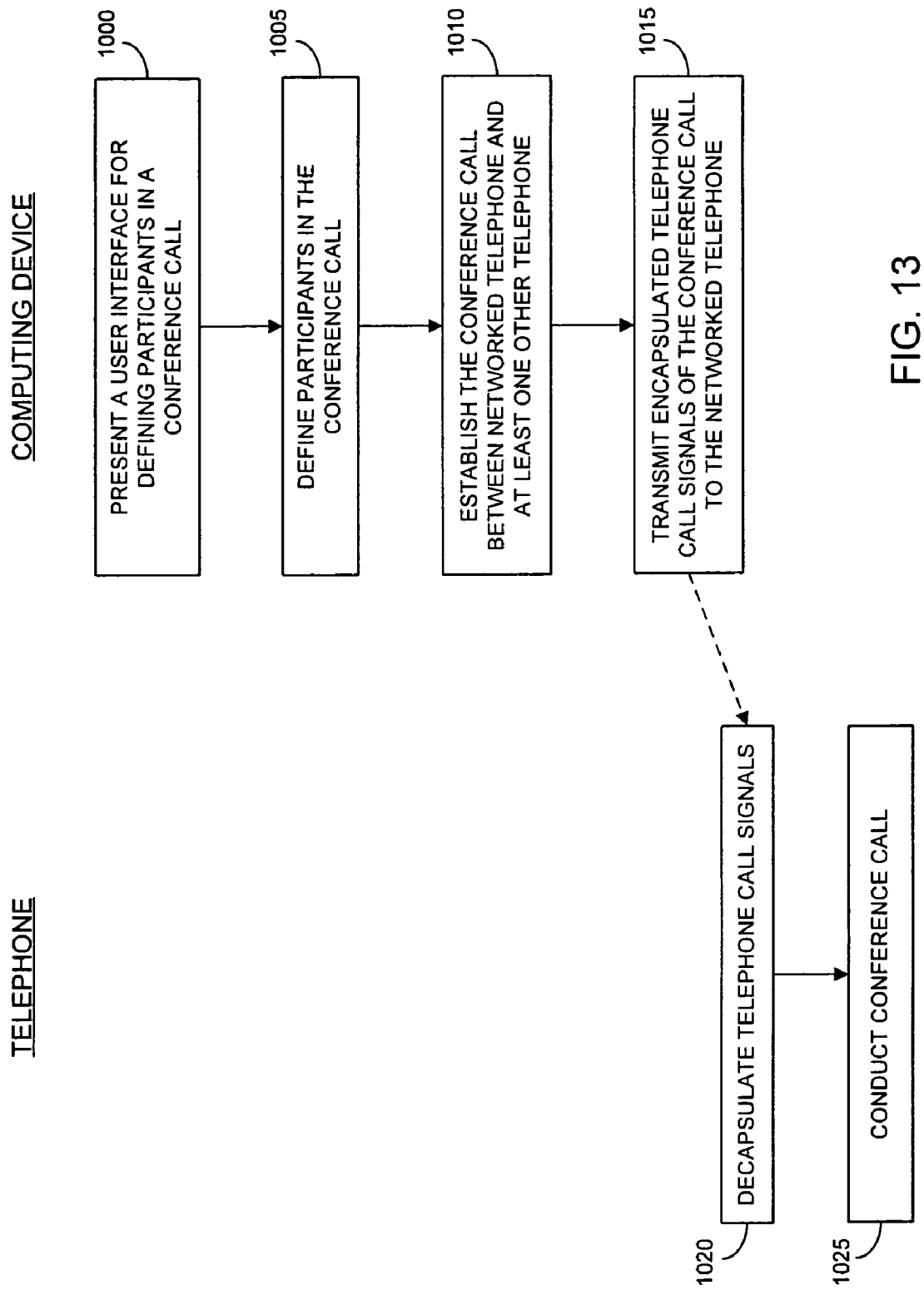
FIG. 13 is a flow diagram of a process according to some embodiments.

FIG. 13 illustrates process steps to establish a conference call according to some embodiments. Initially, at 1000, computing device 10 presents a user interface for defining participants in the conference call. Such an interface may comprise Web page 900 of FIG. 9, and may be presented on display 270 and/or within a Web browser of another device having access to telephone control server application 296.

The participants in the conference call are defined at 1005. Definition of the participants may comprise receiving user input to the presented user interface and storing the input in conference call definitions database 298. Other details of the conference call such as those described above may be defined at 1005.

The conference call is established between telephone 30 and at least one other telephone at 1010. The conference call may be established by receiving encapsulated telephone call signals from telephone 30 over network 20 and creating a connection between the at least one other telephone and telephone 30 based on the telephone call signals and based on the defined details of the conference call.

Next, at 1015, encapsulated telephone call signals of the conference call are transmitted from computing device 10 to telephone 30. Telephone 30 receives and decapsulates the telephone call signals at 1020 and conducts the conference call at 1025.

FIG. 14 illustrates process steps to establish a conference call using conferencing capabilities of telephone 30 according to some embodiments. At 1100, computing device 10 presents a user interface such as Web page 900 for defining participants in the conference call. A user manipulates the interface to indicate that the conference call is to include telephone handsets 95 and 100, and a corresponding definition is stored in conference call definitions database 298.

Computing device 10 may then receive encapsulated telephone call signals from one of telephone handsets 95 and 100, decapsulate the telephone call signals, and determine, based on the signals and based on information stored in conference call definitions database 298, that the telephone call signals are associated with a conference call between telephone handsets 95 and 100.

Computing device 10 therefore encapsulates the telephone call signals and transmits the encapsulated telephone call signals to telephone 30 at 1110. Telephone 30 decapsulates the telephone call signals at 1115 and determines that the telephone call signals are associated with a conference call between handsets 95 and 100. In this regard, the received telephone call signals may include data from computing device 10 indicating that the telephone call signals are associated with a conference call between handsets 95 and 100.

Telephone 30 establishes a conference call between handsets 95 and 100 at 1120 using its embedded conferencing capability. The conference call is thereafter conducted at 1125.

The particular arrangements of process steps described above are not meant to imply a fixed order; embodiments can be practiced in any order that is practicable. In some embodiments, the process steps may be executed by elements of telephone 30 and elements of computing device 10, and may be performed by any device or by any number of devices in combination. Moreover, some or all of the process steps may be performed manually.

The processes described herein may be embodied as program code developed using an object-oriented language that allows the modeling of complex systems with modular objects to create abstractions that are representative of real world, physical objects and their interrelationships. However, embodiments may be implemented in many different ways using a wide range of programming techniques as well as general-purpose hardware systems or dedicated controllers. In addition, in some embodiments, many, if not all, of the elements described above are optional or can be combined into single elements.

Any embodiments described above are not intended to be limited to the specific form set forth herein, but are intended to cover such alternatives, modifications and equivalents as can reasonably be included within the spirit and scope of the appended claims.

What is claimed is:

1. A method comprising:
   receiving, at a telephone, telephone call signals from a Packet-Switched Telephone Network;
   encapsulating the telephone call signals to a computer network protocol;
   transmitting the encapsulated telephone call signals from the telephone to an external computing device;
   decapsulating the encapsulated telephone call signals at the external computing device;
   determining, at the external computing device, that the telephone call signals are intended for the telephone that received the telephone call signals from the Packet-Switched Telephone Network; and
   transmitting the telephone call signals from the external computing device back to the telephone that received the telephone call signals from the Packet-Switched Telephone Network to establish a telephone call.

2. A method according to claim 1, wherein the call signals specify a first telephone functionality associated with a first one of a plurality of handsets that are associated with the telephone, and a second telephone functionality associated with a second one of the plurality of handsets.

3. A system, comprising:
   a telephone to receive telephone call signals from a Packet-Switched Telephone Network, to encapsulate the telephone call signals to a computer network protocol, and to transmit the encapsulated telephone call signals; and
   a computing device to receive the encapsulated telephone call signals from the telephone, to decapsulate the encapsulated telephone call signals, to determine that the telephone call signals are intended for the telephone that received the telephone call signals from the Packet-Switched Telephone Network, and to transmit the telephone call signals back to the telephone that received the telephone call signals from the Packet-Switched Telephone Network to establish a telephone call.

4. A system according to claim 3, the telephone comprising:
   a base station; and
   a plurality of handsets in communication with the base station.

5. A system according to claim 3, wherein the call signals specify a first telephone functionality associated with a first one of the plurality of handsets, and a second telephone functionality associated with a second one of the plurality of handsets.

* * * * *